United States Patent [19]

Sutherland

[11] 4,397,584
[45] Aug. 9, 1983

[54] TRAWL RESISTANT SENSOR MOUNT

[75] Inventor: Alexander L. Sutherland, Carriere, Miss.

[73] Assignee: The United States of America as represented by the Secretary of the Navy, Washington, D.C.

[21] Appl. No.: 294,667

[22] Filed: Aug. 20, 1981

[51] Int. Cl.³ .................... F16L 1/00; B63B 21/52
[52] U.S. Cl. ............................ 405/172; 405/158; 441/23; 441/32
[58] Field of Search .......... 405/172, 158, 154, 159; 441/23, 28, 32

[56] References Cited

U.S. PATENT DOCUMENTS

| | | | |
|---|---|---|---|
| 2,342,363 | 2/1944 | Oestnaes | 441/23 X |
| 2,572,255 | 10/1951 | Gallaway | 441/23 X |
| 3,384,867 | 5/1968 | Bridges | 441/23 X |
| 3,511,092 | 5/1970 | Saunders | 73/344 |
| 3,552,204 | 1/1971 | Tourmen | 73/170 |
| 3,561,267 | 2/1971 | Costello | 73/344 |
| 3,587,310 | 6/1971 | Brown | 73/170 |
| 3,656,345 | 4/1972 | Ingram | 73/170 |
| 4,177,530 | 12/1979 | Swenson | 441/23 |

Primary Examiner—Dennis L. Taylor
Attorney, Agent, or Firm—R. F. Beers; Francis I. Gray

[57] ABSTRACT

A trawl resistant sensor mount which is resistant to trawler damage and to upsetting. A sensor is held by a strong net which anchors the sensor to an anchor. A float having a streamlined shape encases the sensor and maintains it upright. An electromechanical cable of sufficient weight to bury itself in the seafloor is attached to the sensor by an underwater connector, and is mechanically terminated to the anchor.

5 Claims, 1 Drawing Figure

TRAWL RESISTANT SENSOR MOUNT

BACKGROUND OF THE INVENTION

1. Field of the Invention

The present invention relates to a mounting for ocean bottom sensors, and more particularly to a trawl resistant sensor mount which avoids entanglement with trawl nets.

2. Description of the Prior Art

For oceanographic applications sensors of various types are often mounted on the seafloor. In shallow waters such as the continental shelf where extensive trawl fishing is carried on these sensors are often entangled in the trawl nets. Also these sensors are subject to being knocked down or upset by wave or current induced forces.

SUMMARY OF THE INVENTION

Accordingly, the present invention provides a trawl resistant sensor mount which is resistant to trawler damage and to upsetting. A sensor is held by a strong net which anchors the sensor to an anchor. A float having a streamlined shape encases the sensor and maintains it upright. An electromechanical cable of sufficient weight to bury itself in the seafloor is attached to the sensor by an underwater connector, and is mechanically terminated to the anchor.

Therefore, it is an object of the present invention to provide a trawl resistant sensor mount which will maintain a sensor mounted on the seafloor upright.

Other objects, advantages and novel features of the present invention will be apparent from the following detailed description when read in conjunction with the appended claims and attached drawing.

BRIEF DESCRIPTION OF THE DRAWING

The FIGURE is a partial cross-sectional view of a trawler resistant sensor mount according to the present invention.

DESCRIPTION OF THE PREFERRED EMBODIMENT

Figure 1:
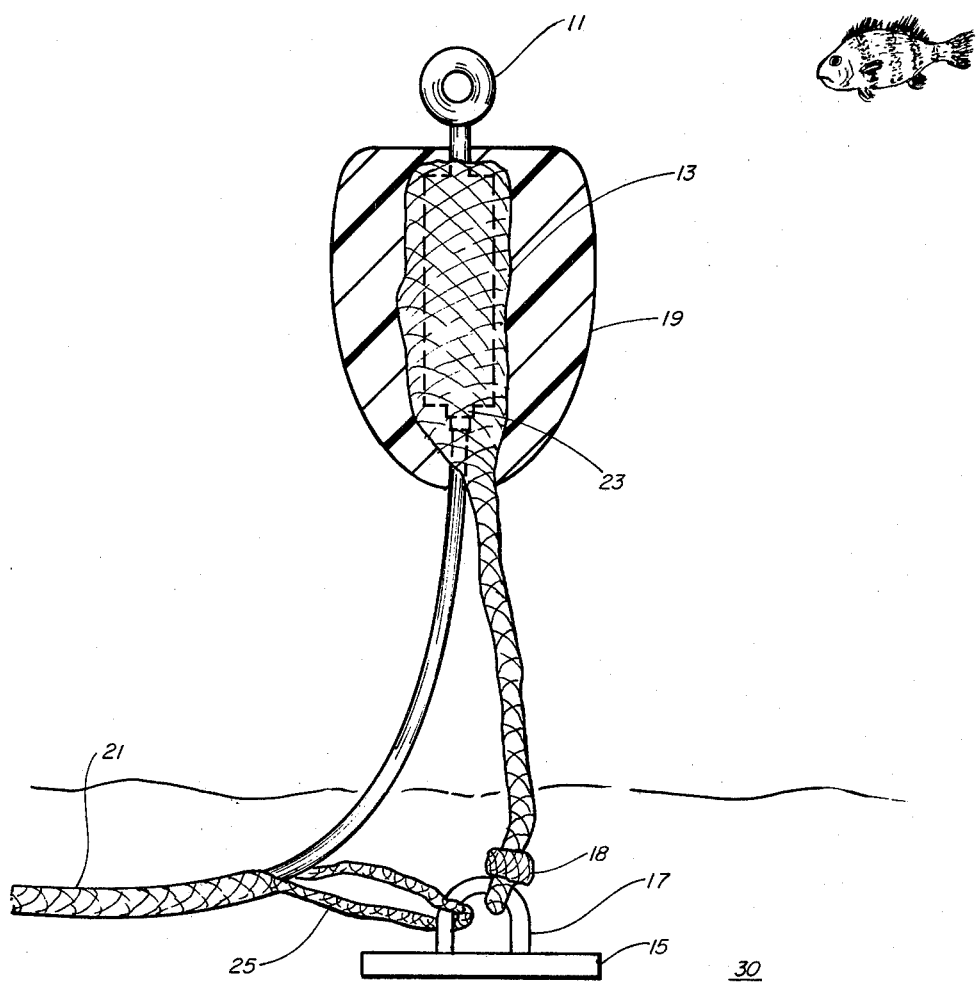

Referring now to the FIGURE a sensor 11 is held by a strong net 13 of a material such as Kevlar. The net 13 structurally anchors the sensor 11 to an anchor 15, such as a flat plate having a padeye 17, via a simple bowline knot 18 or similar means. A float 19 of a buoyant material such as syntactic foam encases the sensor 11. The float 19 has a smooth streamlined outer surface and is machined or molded to fit the sensor 11. An electromechanical cable 21 is attached to the sensor 11 by an underwater connector 23. The cable 21 is mechanically terminated to the anchor 15 by a cable grip 25 around the padeye 17.

In operation the anchor 15 and cable 21 are either jetted into the seafloor 30 or settle into the seafloor due to their own weight. The sensor 11 is held upright by the float 19 a short distance above the seafloor 30, typically three feet. Since the anchor 15 and cable 21 are buried in the seafloor 30, they cannot be entangled by a trawl net. Also, since the float 19 is streamlined in shape, there are no edges that would be entangled in a trawl net. As a net passes over the sensor 11, the sensor 11 bends and the net slides harmlessly over the float 19. After the net has passed or the sensor 11 has been upset by other means such as wave or current induced action, the float 19 returns the sensor to its normal upright position.

Thus, the present invention provides a seafloor trawl resistant sensor mount with a streamlined float and buried anchor and cable to avoid net entanglement and maintain the sensor in an upright position.

What is claimed is:

1. A sensor mount for an oceanographic sensor at the bottom of a body of water comprising:
   means for anchoring said sensor to said bottom;
   a net around said sensor, said net holding and integrally connecting said sensor to said anchoring means;
   an electromechanical cable electrically connected to said sensor and mechanically connected to said anchoring means to hold said sensor a short distance above said bottom, said electromechanical cable being buried in said bottom; and
   a float of a buoyant material encasing said net and sensor to return said sensor to an upright position when upset, said flat having a streamline shape with no edges to prevent entanglement of said sensor in a trawl net.

2. A sensor mount as recited in claim 1 wherein said buoyant material of said float comprises a syntactic foam molded about said net and sensor.

3. A sensor mount as recited in claim 2 wherein said anchoring means comprises:
   a flat plate; and
   a padeye integral with one surface of said flat plate to which said net and said electromechanical cable are connected.

4. A sensor mount as recited in claim 3 wherein said electromechanical cable further comprises an integral cable grip which attaches to said padeye to secure said electromechanical cable to said anchoring means.

5. A sensor mount as recited in claim 4 wherein the material of said net comprises Kevlar.

* * * * *